United States Patent [19]

Patron et al.

[11] 4,087,359

[45] May 2, 1978

[54] PROCESS FOR REMOVING MERCURY AND MERCURY SALTS FROM LIQUID EFFLUENTS

[75] Inventors: Germano Patron, Venice; Domenico Napoli, Venice-Mestre; Franco Nardone, Mestre (Venice); Gianluigi Ratti, Venice; Giuseppe Tubiello, Novara, all of Italy

[73] Assignee: Montedison S.p.A., Milan, Italy

[21] Appl. No.: 658,976

[22] Filed: Feb. 18, 1976

Related U.S. Application Data

[63] Continuation of Ser. No. 495,782, Aug. 8, 1974, abandoned.

[30] Foreign Application Priority Data

Aug. 9, 1973 Italy .................. 27716 A/73

[51] Int. Cl.² ............................................. C02B 1/20
[52] U.S. Cl. ........................................ 210/50; 75/108; 75/121; 210/53; 210/54; 423/101
[58] Field of Search ...................... 75/108, 109, 121; 210/42, 50, 51–54, 59; 423/101, 104, 106

[56] References Cited

U.S. PATENT DOCUMENTS

| 3,369,886 | 2/1968 | Metzger et al. | 75/109 |
|---|---|---|---|
| 3,377,274 | 4/1968 | Burke et al. | 210/53 |
| 3,476,552 | 11/1969 | Parks et al. | 75/121 |
| 3,674,428 | 7/1972 | Dean et al. | 210/50 |
| 3,695,838 | 10/1972 | Knepper et al. | 423/106 |
| 3,740,331 | 6/1973 | Anderson et al. | 210/53 |
| 3,764,495 | 10/1973 | Guptill et al. | 75/121 |
| 3,847,598 | 11/1974 | Coulter et al. | 210/50 |
| 3,857,704 | 12/1974 | Coulter | 210/50 |

FOREIGN PATENT DOCUMENTS

| 2,291,156 | 6/1976 | France | 210/50 |
|---|---|---|---|
| 2,057,358 | 5/1972 | Germany | 210/50 |
| 2,437,779 | 2/1975 | Germany | 210/51 |

OTHER PUBLICATIONS

Condensed Chemical Dictionary, 1971, p. 460.

*Primary Examiner*—Charles N. Hart
*Assistant Examiner*—Peter A. Hruskoci

[57] ABSTRACT

Mercury and mercury salts are removed from liquid effluents (which may also comprise muds and inert products in suspension) by reacting the liquid effluents, at a pH of from 9 to 14, with thiourea or a hydroxylamine salt, and subsequently separating the resulting precipitate, together with muds and inert products, if any, by clari-flocculation.

7 Claims, No Drawings

PROCESS FOR REMOVING MERCURY AND MERCURY SALTS FROM LIQUID EFFLUENTS

This is a continuation of application Ser. No. 495,782, filed Aug. 8, 1974, now abandoned.

BACKGROUND OF THE INVENTION

As is well known, the effluents from industrial plants which produce or use metallic mercury and/or mercury salts, (as in the production of chloro-alkalis with mercury cathode cells; the production of derivatives and metallic mercury; the recovery of mercury from processing wastes, etc.) and which are discharged into public waters, pollute the water with resulting biological damage.

In general, the environmental laws in force throughout the world impose such tight limits on the concentration of pollutants which may be present in water that complicated, expensive plants are required for the purification of the effluents which contain mercury and mercury derivatives.

As is also known, the mercury ion, particularly in solutions containing chlorides, forms a variety of compounds such as, for example, $[HgCl_4]^{--}$, $HgClOH$, and $HgCl_2 \cdot nH_2O$, all of which are more or less soluble even in alkaline media. Consequently, in purifying effluents polluted by mercury and mercury derivatives it is always necessary to deal with a wide range of more or less soluble compounds, and this makes the operation still more complicated because, at least in some instances, it is necessary to use several different purifying agents.

The present chemical purifying processes, (for example, those using hydrazine, sodium sulfide, sodium borohydride, reducing metals, etc) almost always lead to an insoluble product which is hardly separable from water, so that complicated and expensive decanting operations are required, followed by filtering with the use of filtering aids.

In other of the known processes (for example processes involving the use of resins), the inevitable presence of muds and inert products which exist naturally in the water to be treated requires pre-treatment of the water for the removal of the naturally occurring mud and inert products by filtering or decanting upstream of the purification plant.

THE PRESENT INVENTION

A primary object of this invention is to provide a process in accordance with which mercury is removed from liquid effluents containing it by precipitation with the use of only one reagent, regardless of the form in which the mercury is present in the effluents treated.

Another object is to provide a process whereby mercury is removed from liquid effluents containing it by precipitation thereof in such a form as to be separable from the effluents by simple clari-flocculation.

A further object is to provide a process for removing mercury from liquid effluents containing it and also containing naturally occurring mud and inert products in suspension whereby the mercury is effectively removed without prior removal of the suspended mud and inert products by filtering and decanting upstream of the purification plant.

These and other objects are accomplished by the process of this invention in accordance with which mercury and mercury salts are removed from liquid effluents containing the same (and, possibly, naturally occurring suspended muds and inert products) by reacting the effluent, at a pH of from 9 to 14, with thiourea or with a hydroxylamine salt to precipitate the mercury and/or mercury derivatives and then separating the precipitate, together with muds and inert products, if any, by simple clari-flocculation.

We have found that when thiourea is fed into waters containing mercury and/or mercury salts, it functions both as a precipitating agent and as a reducing agent for oxidizers, such as chlorine, which may be present in the waters treated. We have also found that hydroxylamine serves as both a precipitating agent by forming highly insoluble amino-mercury salts and as a reducing agent which originates metallic mercury from mercury derivatives.

The mercury and mercury salts are removed very efficiently in the process of this invention, regardless of the concentration thereof in the effluents which are purified. As an example, the waste waters from chlorine-soda plants in which, in general, the mercury concentration is 1–10 ppm, are effectively purified by the present process.

As indicated, the waters to be purified and containing, or not, naturally occurring muds and by-products in suspension, are treated with the thiourea or hydroxylamine salt at a pH of from 9 to 14. The waters can be adjusted to a pH in the range of 9 to 14 by treatment thereof with a 10–50% aqueous NaOH solution. When the precipitating (and reducing) agent is thiourea, the waters to be purified are preferably treated with the thiourea at a pH of from 10 to 12. On the other hand, the optimum results are obtained when the precipitating (and reducing) agent is a hydroxylamine salt by treating the polluted waters with said salt at a pH of 11 or 12.

Since the effluents coming from the production of chloroalkalis in mercury cathode cells are always alkaline and, therefore, the thiourea or hydroxylamine salt may be added to those waters without prior adjustment of the pH thereof to a value in the range 9 to 14.

In practice, the thiourea is added to the polluted waters in the form of an aqueous solution, and dosed in a minimum amount of 0.38 g. of $H_2N-CS-NH_2$ per gram of soluble mercury fed. If chlorine is also present in the effluent, then at least 0.35 g. of $H_2N-CS-NH_2$ per gm of $Cl_2$ is added, in addition to the amount calculated proportionally on the soluble mercury fed. In practice, the purification is conducted using thiourea in an excess of 10 to 500%.

When hydroxylamine is used as the purifying medium, it is added to the waters to be treated as an aqueous solution of any soluble salt thereof, for example, as an aqueous solution of the chlorohydrate or sulfate. In practice, the dosage is such that an excess of 5 to 200 grams of $NH_2OH$ per $m^3$ of slurry is maintained in the waters being purified throughout the purifying reaction. Preferably, the purification is conducted while maintaining an excess of 15–60 gms of $NH_2OH/m^3$. The dosage required can be easily checked by polarographic analysis.

The precipitated mercury salts and/or metallic mercury can be separated by clari-flocculation. By that is meant that after a reaction time of 1 to 15 hours, preferably 3 – 6 hours, if the precipitating agent is thiourea, or of 5 to 10 hours if it is hydroxylamine, the slurry is sent to a clarifier in which it is mixed with an acid coagulant, for example, an aqueous solution of $FeCl_3$ or $MgCl_2$. In a presently preferred embodiment of the invention, the acid coagulant is an aqueous 10 to 20% solution of $FeCl_3$ used in a quantity of 10 to 200 g of $FeCl_3/m^3$ of water.

The addition of the acid coagulant to the alkaline medium results in the instantaneous precipitation of the corresponding hydroxide with the formation of flocks. The flocks formed can be thickened by the addition of co-agents such as polyalcohols, polyacrylamides, etc. used in an amount of 0.1–10g/$m^3$ of the water to be purified. In treating turbid waters, the best results are obtained by adding an aqueous solution containing from 0.1 to 1% of the co-agent by weight.

If desired, the separation of the precipitated mercury can be facilitated by replacing a portion of the acid coagulator introduced into the clarifier, e.g., 40-60% thereof, with an equal weight of a bentonite clay.

In the clarifier, the precipitated naturally occurring suspended muds and inert by-products, if any, metallic mercury and/or mercury salts are occluded to the flocculated hydroxide and withdrawn at the bottom of the clarifier.

When the precipitating (and reducing) agent is thiorurea, the overflow of the clarifier consists of the limpid waters containing, in total, 0.01 to 0.05 ppm of mercury which is practically entirely in the ionic-soluble form and biologically tolerable.

If the precipitating (and reducing) agent is hydroxylamine, the limpid waters contain no more than 0.1 ppm of mercury which is practically entirely in the ionic-soluble form.

If, to satisfy existing environmental standards, it is required to reduce the mercury content of the waters treated even further, the minute amount of mercury in the waters leaving the clarifier can be readily removed by absorption on resins, chelating agents or active carbon.

The mud discharged from the bottom of the clarifier, if any, and thickened or not, is conveyed to a zone in which it is subjected to known mercury-recovering treatments.

The present process for purifying waters contaminated by mercury and/or mercury salts has many practical advantages. It is easy to practice, requires a small to moderate plant investment, and, utilizing low cost reactants in small amounts, is economical.

In addition to the advantages mentioned, the present process has specific advantages over known processes using $Na_2S$ or NaHS which also result in the precipitation of insoluble sulfides.

The precipitate which is obtained with thiourea consists of mercury sulfides (prevailingly cubic metacinnabar) in a form which is easy to separate physically (decanting, filtering, etc.). In contrast, when $Na_2S$ is used, the precipitate is so hard to separate physically as to require, for example in filtering, expensive filtering aids.

Compared to NaHS or $Na_2S$, the precipitation of Hg sulfides with thiourea has the advantage that the concentration of residual Hg in the purified waters is lower, on the average.

The purification according to this invention is carried out in an alkaline medium without strict pH control. On the contrary, when $Na_2S$ or NaHS is used, an acid medium is employed and the pH is strictly controlled within well-established limits. The acid pH of the medium requires unavoidable venting of $H_2S$ at various points in the system, and washing of the $H_2S$ with alkalis.

Additional advantages and characteristics of the present process will be apparent from the following examples which are intended as illustrative, not limiting.

EXAMPLE 1

The waters to be treated had the following average composition:

| | |
|---|---|
| total Hg | 6g/$m^3$ |
| soluble ionic Hg | 3.5" |
| $Cl_2$ | 10" |
| Suspended solids (essentially Ca and Fe hydroxides, basic Mg carbonate, Si $O_2$ and silicates) | 200" |
| Na Cl | 19 kg/$m^3$ |
| Na OH (total alkalinity) | 3 kg/$m^3$ |

The temperature of the waters was 20° C and the pH at that temperature was 11.3.

The waters were conveyed to the reaction zone at a rate of 1$m^3$/hr, together with 10 g/h of thiourea in a 5% water solution. After 8 hours reaction, the slurry was conveyed to the clariflocculation where 2 l/h of an aqueous $FeCl_3$ solution at 25 g/l and 2 l/h of an aqueous solution at 0.5 g/l of co-agent (Praestol 2935/74; polyacrylamide produced by Tillmanns S.p.A.) were fed. At the outlet, in the overflow waters, the concentration of residual Hg amounted to 0.02–0.04 ppm. The discharged muds had a 2.4% Hg content referred to the dry weight of the muds.

EXAMPLE 2

The waters to be treated had the following average composition:

| | |
|---|---|
| total Hg | 4 g/$m^3$ |
| soluble ionic Hg | 2 " |
| $Cl_2$ | 10 " |
| Suspended solids (essentially Ca and Fe hydroxides, basic Mg carbonate, $SiO_2$ and silicates) | 200 " |
| NaCl | 19 kg/$m^3$ |
| NaOH (total alkalinity) | 3 " |

The temperature of the waters was 20° C and the pH at that temperature was 11.3.

The waters were conveyed to the reaction zone at a rate of 1$m^3$/hr, together with 10 g/h of thiourea in a 5% aqueous solution. After 8 hours reaction, the slurry was conveyed to clariflocculation where there were fed:
1 l/h of an aqueous $FeCl_3$ solution at 25 g/l,
25 g/h of bentonite clay Depural (produced by Cinicola),
2 l/h of an aqueous solution of co-agent Praestol 2935/74, at 0.5 g/l.

At the outlet, in the overflow waters, the concentration of residual Hg was 0.02–0.03 ppm. The discharged muds had a content of 1.5% of Hg referred to the dry weight of the muds themselves.

EXAMPLE 3

(a) 5 g of $HgCl_2$ and 200 g of NaCl were dissolved in 1000 ml of water.

After the addition of NaOH 20% up to a pH of 12, 3g of thiourea were added. The whole was allowed to rest for 70 hours and filtered through a porous diaphragm.

In the filtered solution, the residual concentration of Hg was 0.04 ppm. The Hg/S ratio in the precipitate was practically equal to the stoichiometric ratio of HgS. The precipitate examined by X-rays diffraction appeared to consist of HgS prevailingly in the form of cubic metacinnabar.

(b) 5 g of $HgCl_2$ and 200 g of NaCl were dissolved in 1000 ml water.

After the addition of NaOH 20% up to a pH of 12, 3 g of $Na_2S$ were added. The whole was allowed to rest for 70 hours and filtered through a porous diaphragm. In the filtered solution, the residual concentration of Hg appeared to be higher than 10 ppm.

(c) 5 g of $HgCl_2$ and 200 g of NaCl were dissolved in 1000 ml water.

After the addition of HCl 20% up to a pH of 1.7, 3 g of $Na_2S$ were added. The whole was allowed to rest for 70 hours and filtered through a porous diaphragm. In the filtered solution, the residual concentration of Hg appeared to be 1.5 ppm.

As is apparent from comparative runs (b) and (c), the residual concentration of Hg is considerably higher than when thiourea is used as the precipitating agent.

EXAMPLE 4

1 $m^3$/h of the same waters of Example 2 (at the same conditions of temperature and pH) was conveyed to the reaction zone together with 150 g/h of hydroxylamine sulfate in a 150 g/l aqueous solution.

After 10 hours reaction, the slurry was conveyed to the clariflocculation where 2 l/h of an aqueous $FeCl_3$ solution at 25 g/l and 2 l/h of an aqueous solution at 0.5 g/l of co-agent (Praestol 2935/74; polyacrylamide produced by Tillmanns S.p.A.) were fed. At the outlet, in the overflow waters, the concentration of residual Hg amounted to 0.1 ppm. The discharged muds had a 1.5% Hg content referred to the dry weight of the muds.

EXAMPLE 5

The waters to be treated had the following average composition:

| | |
|---|---|
| total Hg | 3 g/$m^3$ |
| soluble ionic Hg | 1 " |
| $Cl_2$ | 10 " |
| Suspended solids (essentially Ca and Fe hydroxides, basic Mg carbonate, $SiO_2$ and silicates) | 200 " |
| NaCl | 19 kg/$m^3$ |
| NaOH (total alkalinity) | 3 " |

The temperature of the waters was 20° C and the pH at such temperature was 11.3.

1 $m^3$/h of said waters was conveyed to the reaction zone together with 150 g/h of hydroxylamine sulfate in a 150 g/l aqueous solution. After 10 hours reaction, the slurry was conveyed to the clari-flocculation where there were fed:

1 l/h of an aqueous $FeCl_3$ solution at 25 g/l, 25 g/h of bentonite clay Depural (produced by Cinicola), 2 l/h of an aqueous solution of co-agent Praestol 2935/74, at 0.5 g/l.

At the outlet, in the overflow waters, the concentration of residual Hg was 0.1 ppm. The discharged muds had a content of 1.2% of Hg referred to the dry weight of the muds themselves.

What we claim is:

1. A process for removing mercury and mercury salts from aqueous industrial plant effluents containing the same, together with suspended muds and other solids consisting essentially of Ca and Fe hydroxides, basic Mg carbonate, $SiO_2$ and any silicates present in the aqueous industrial plant effluent, said process comprising reacting the effluent at a pH of from 9 to 13, with thiourea, in a minimum amount of 0.38 grams of thiourea per gram of soluble mercury fed, until the mercury and mercury salts are precipitated, and thereafter separating the precipitate thus formed from the resulting slurry, together with any muds and other solids present in the starting aqueous industrial plant effluent, by clari-flocculation.

2. The process according to claim 1, in which the precipitate is flocculated by adding to the slurry, as an acid coagulant, an amount of an aqueous solution of ferric chloride such that the amount of $FeCl_3$ per $m^3$ of slurry is 10–200 grams, and which precipitates in the form of a hydroxide with formation of flocks which are thickened by the addition of a co-agent selected from the group consisting of polyalcohols and polyacrylamides.

3. The process according to claim 2, in which the co-agent is used in an amount of 0.1–10 grams per $m^3$ of slurry.

4. The process according to claim 2, in which the acid coagulant is partly replaced by a bentonite clay.

5. The process of claim 1, in which the pH of the aqueous industrial plant effluent to be purified is adjusted by the addition thereto of an aqueous NaOH solution.

6. The process according to claim 1, in which the aqueous industrial plant effluent to be purified is treated at a pH of from 10 to 12.

7. The process according to claim 1, in which the aqueous industrial plant effluent also contains chlorine and the quantity of thiourea fed thereto is increased by adding at least another 0.35 grams of $H_2N-CS-NH_2$ per gram of $Cl_2$.

* * * * *

UNITED STATES PATENT AND TRADEMARK OFFICE
CERTIFICATE OF CORRECTION

PATENT NO. : 4,087,359
DATED : May 2, 1978
INVENTOR(S) : Germano PATRON et al

It is certified that error appears in the above—identified patent and that said Letters Patent is hereby corrected as shown below:

Col. 2, line 34, "11 or 12" should read ---11 to 12---.

Col. 2, line 63, "thiorurea" should read ---thiourea---.

Col. 3, lines 21-22, "thiorurea" should read ---thiourea---.

Signed and Sealed this

Tenth Day of March 1981

[SEAL]

Attest:

RENE D. TEGTMEYER

*Attesting Officer*  *Acting Commissioner of Patents and Trademarks*